(12) United States Patent
Branson et al.

(10) Patent No.: US 9,305,031 B2
(45) Date of Patent: Apr. 5, 2016

(54) EXITING WINDOWING EARLY FOR STREAM COMPUTING

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/864,805

(22) Filed: Apr. 17, 2013

(65) Prior Publication Data
US 2014/0317150 A1 Oct. 23, 2014

(51) Int. Cl.
G06F 17/30 (2006.01)
G06F 7/00 (2006.01)

(52) U.S. Cl.
CPC ................................ G06F 17/30289 (2013.01)

(58) Field of Classification Search
CPC ............................................... G06F 17/30516
USPC ........................................................ 707/803
See application file for complete search history.

(56) References Cited

U.S. PATENT DOCUMENTS

| | | | |
|---|---|---|---|
| 6,275,957 B1 | 8/2001 | Novik et al. | |
| 6,304,873 B1 | 10/2001 | Klein et al. | |
| 6,338,055 B1 | 1/2002 | Hagmann et al. | |
| 6,339,772 B1 | 1/2002 | Klein et al. | |
| 6,367,034 B1 | 4/2002 | Novik et al. | |
| 6,463,470 B1 * | 10/2002 | Mohaban | H04L 12/5695 709/223 |
| 7,483,907 B2 | 1/2009 | Ganguly et al. | |
| 7,610,397 B2 | 10/2009 | Gedik et al. | |
| 7,613,848 B2 | 11/2009 | Amini et al. | |
| 7,631,074 B1 | 12/2009 | Srivastava et al. | |
| 7,644,110 B2 | 1/2010 | Nishizawa et al. | |
| 7,904,444 B1 | 3/2011 | Koudas et al. | |
| 8,086,644 B2 | 12/2011 | Boyer et al. | |
| 8,095,690 B2 | 1/2012 | Kashiyama et al. | |
| 8,122,006 B2 | 2/2012 | de Castro Alves et al. | |
| 8,260,803 B2 | 9/2012 | Hsu et al. | |
| 8,396,886 B1 | 3/2013 | Tsimelzon et al. | |
| 8,768,956 B2 | 7/2014 | Kashiyama | |
| 2006/0101048 A1 * | 5/2006 | Mazzagatti | G06F 17/30327 707/999.101 |
| 2006/0195599 A1 * | 8/2006 | Gedik et al. | 709/231 |

(Continued)

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

(Continued)

*Primary Examiner* — Pavan Mamillapalli
(74) *Attorney, Agent, or Firm* — Richard A. Wilhelm; Feb R. Cabrasawan

(57) ABSTRACT

Two or more tuples to be processed by a processing element operating on one or more computer processors may be received by the processing element. The processing element may have a windowing operator performing a windowing operation to determine a first value at the conclusion of a windowing condition. It may be determined from one or more tuples received within the windowing condition whether a condition to end the windowing operation before the windowing condition concludes is met. In addition, the windowing operation may be ended before the windowing condition concludes when the condition to end the windowing operation is met.

13 Claims, 5 Drawing Sheets

(56) References Cited

U.S. PATENT DOCUMENTS

| | | | |
|---|---|---|---|
| 2007/0136239 A1 | 6/2007 | Lee et al. | |
| 2007/0226188 A1 | 9/2007 | Johnson et al. | |
| 2009/0287628 A1* | 11/2009 | Indeck | G06N 5/025 706/47 |
| 2009/0292729 A1* | 11/2009 | Blount | G06N 5/042 707/999.107 |
| 2010/0005241 A1* | 1/2010 | Kim et al. | 711/122 |
| 2011/0082846 A1* | 4/2011 | Bamba | H04W 24/08 707/702 |
| 2012/0110042 A1 | 5/2012 | Barsness et al. | |
| 2012/0124096 A1 | 5/2012 | Krishnamurthy et al. | |
| 2012/0124233 A1 | 5/2012 | Gedik et al. | |
| 2012/0218268 A1 | 8/2012 | Accola et al. | |
| 2012/0296861 A1 | 11/2012 | Chen et al. | |
| 2012/0303597 A1* | 11/2012 | Bird | G06F 17/30094 707/693 |
| 2013/0046725 A1* | 2/2013 | Cammert | G06F 17/30516 706/52 |
| 2013/0051571 A1* | 2/2013 | Nagel | G10L 19/0204 381/56 |
| 2013/0246492 A1* | 9/2013 | Helmrich | G10L 19/022 708/400 |
| 2013/0290367 A1 | 10/2013 | Kashiyama | |
| 2015/0039648 A1* | 2/2015 | Mukherjee | G06N 5/04 707/769 |

OTHER PUBLICATIONS

Jiang et al., "MavEStream: Synergistic Integration of Stream and Event Processing", Second International Conference on Digital Telecommunication (ICDT '07), 2007, © 2007 IEEE.

Salehi et al., "Knowing When to Slide—Efficient Scheduling for Sliding Window Processing", MDM '09 Tenth International Conference on Mobile Data Management: Systems, Services, and Middleware, 2009, pp. 202-211. DOI: 10.1109/MDM.2009.31.

Santosuosso et al., "Management System for Processing Streaming Data", filed Jul. 26, 2011, U.S. Appl. No. 13/190,810.

* cited by examiner

EXITING WINDOWING EARLY FOR STREAM COMPUTING

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program configured to receive two or more tuples to be processed by a processing element, the processing element operating on one or more computer processors. The processing element may have a windowing operator performing a windowing operation to determine a first value at the conclusion of a windowing condition. The method may include determining from one or more tuples received within the windowing condition whether a condition to end the windowing operation is met. In addition, the method may include ending the windowing operation before the windowing condition concludes when the condition to end the windowing operation is met.

The condition to end the windowing operation may be determined once, or two or more times within the window condition. The condition to end the windowing operation may be dynamically determined within the window condition. In one embodiment, the windowing operation may include determining a first sum and the condition to end the windowing operation may include evaluating a second sum. In one embodiment, the windowing operation may includes determining a first central tendency metric, such as a first average, and the condition to end the windowing operation may include evaluating a second central tendency metric, such as a second average. In one embodiment, the evaluating of the second central tendency metric may include determining a standard deviation. In one embodiment, the evaluating of the second central tendency metric includes determining a confidence interval for a t-distribution.

BRIEF DESCRIPTION OF THE DRAWINGS

Like reference numbers and designations in the various drawings indicate like elements.

DETAILED DESCRIPTION

Figure 1:
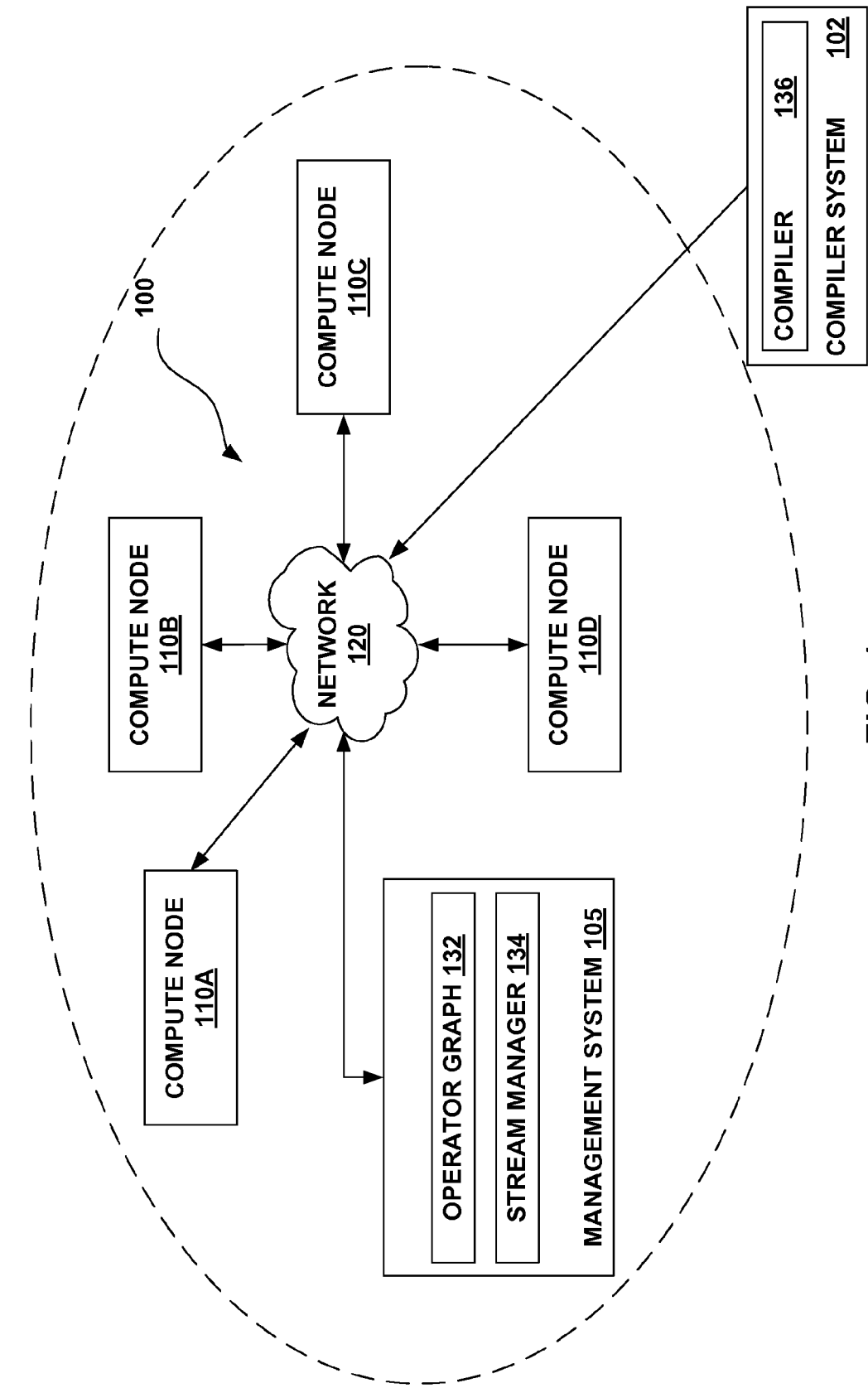
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. It should be understood, however, that it is not required that an output tuple be changed in some way from the input tuple.

Nonetheless, an output tuple may be changed in some way by a stream operator or processing element. An attribute or metadata may be added, deleted, or changed. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. Because an output tuple may be considered a different tuple from a corresponding input tuple, a parent-child scheme may be useful for tracking tuple flow in an operator graph. In an exemplary scheme, any tuple may be designated a parent tuple. For example, a tuple entering an operator graph or a tuple output by a source operator may be designated as a parent tuple. Generally, when a parent tuple is received by a stream operator or processing element, the output corresponding with the input tuple may be designated a child of the parent. The child tuple may in turn be input to another stream operator or processing element. The output from the second stream operator or processing element corresponding with the input child tuple may also be designated a child of the parent, as further described below. In addition, as mentioned, any tuple may be designated a parent tuple. Accordingly, tuple that is a child of a parent tuple may itself be designated a parent tuple.

While a parent-child scheme may be useful for tracking tuple flow in an operator graph in some contexts, in other contexts it may be simpler to refer to both an input tuple and a corresponding output tuple as the same tuple.

In stream computing applications, the stream operators and processing elements of an operator graph may be distributed across multiple compute nodes as well as within individual compute nodes. Processing elements and stream operators in distinct processing elements may be connected by inter-process operator communication paths. An "inter-process communication path," as used herein, may refer to operations that use a network and employ an internet socket, such as a TCP/IP socket, a stream socket, a datagram socket, or any other similar operation. An inter-process communication path, as used herein, may also refer to operations that employ a shared memory segment, a pipe, a named pipe (also known as a FIFO), a message queue, a memory mapped file, a UNIX domain or inter-process communication socket, or any other similar operation.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
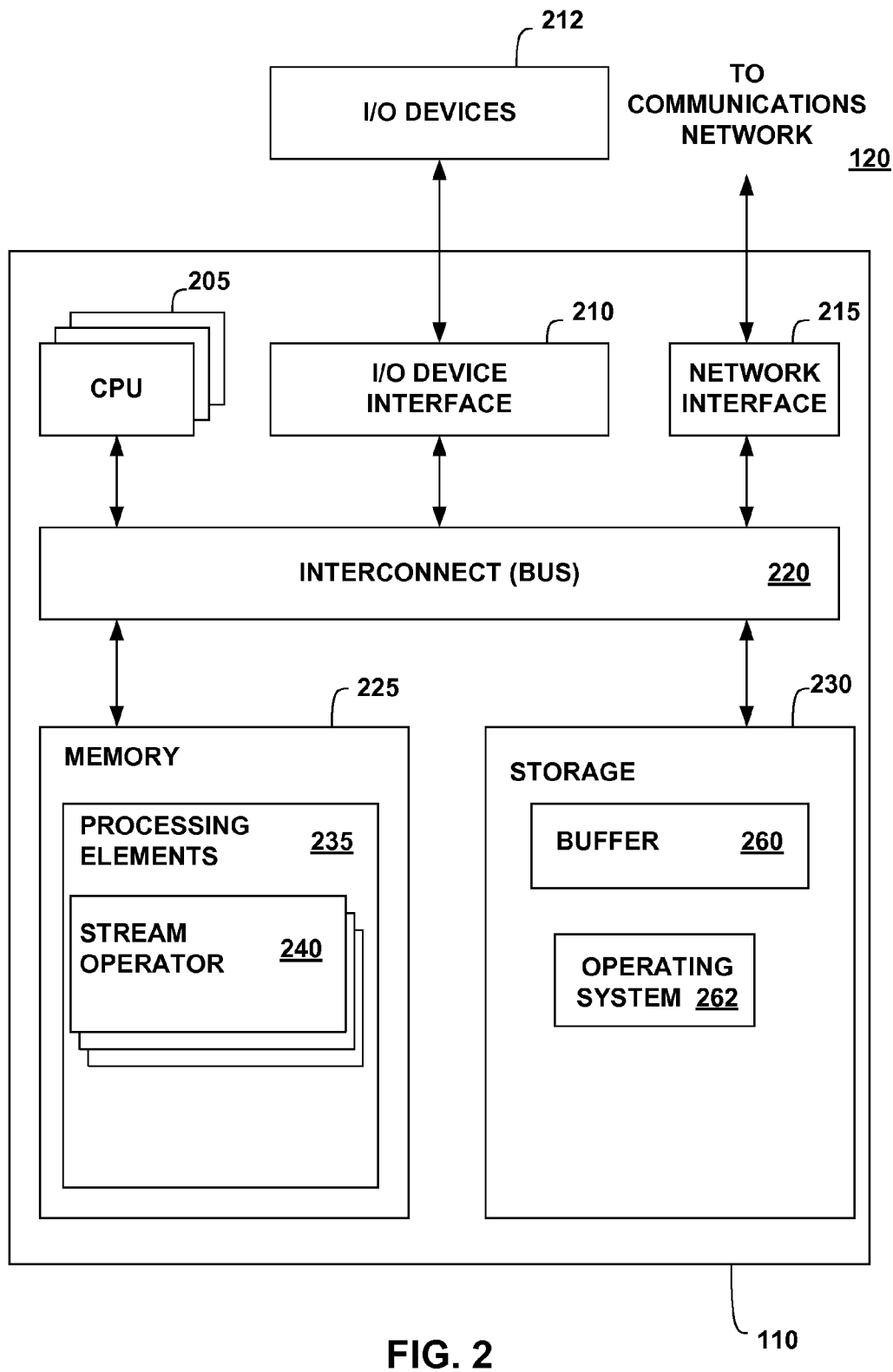
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
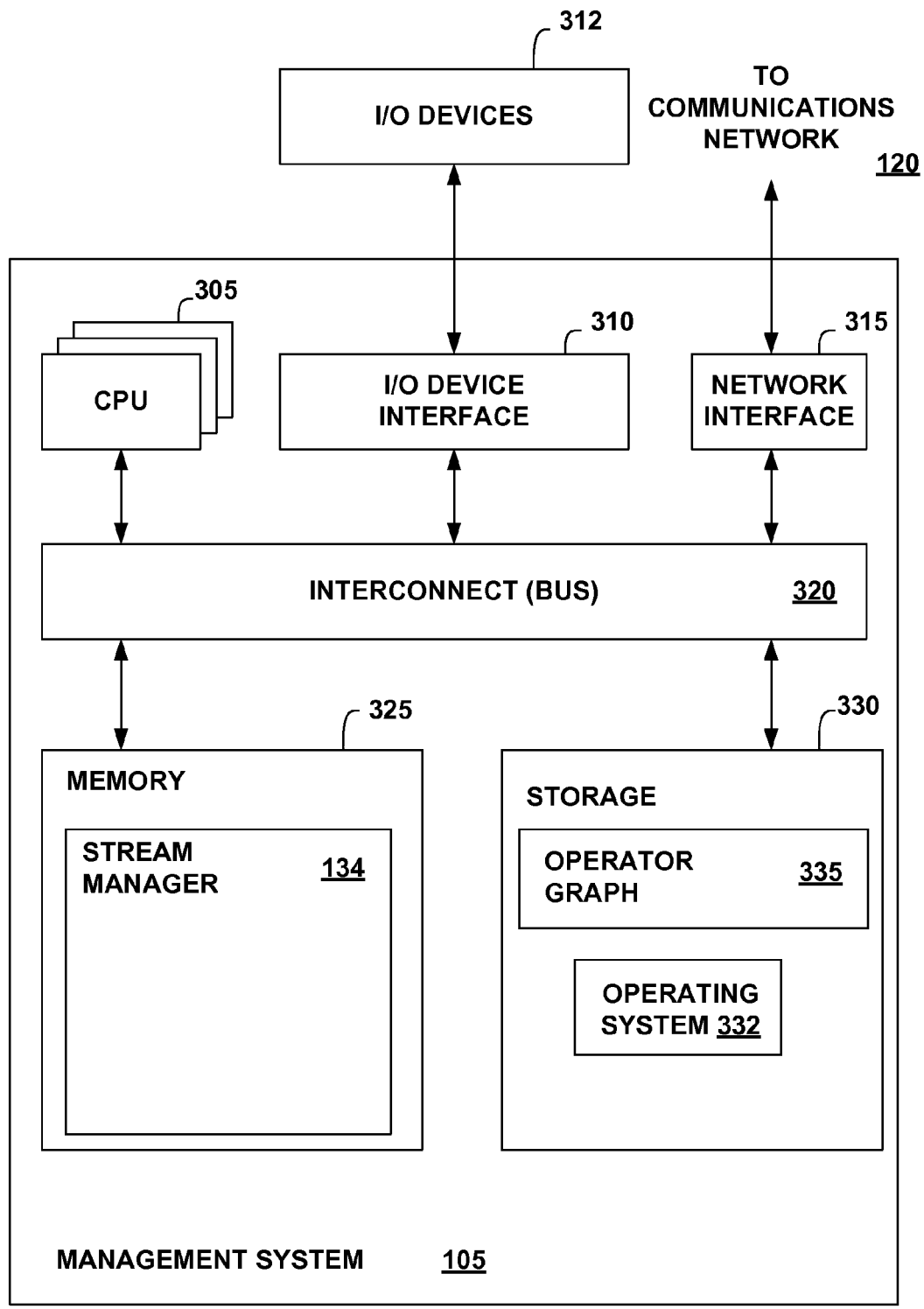
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
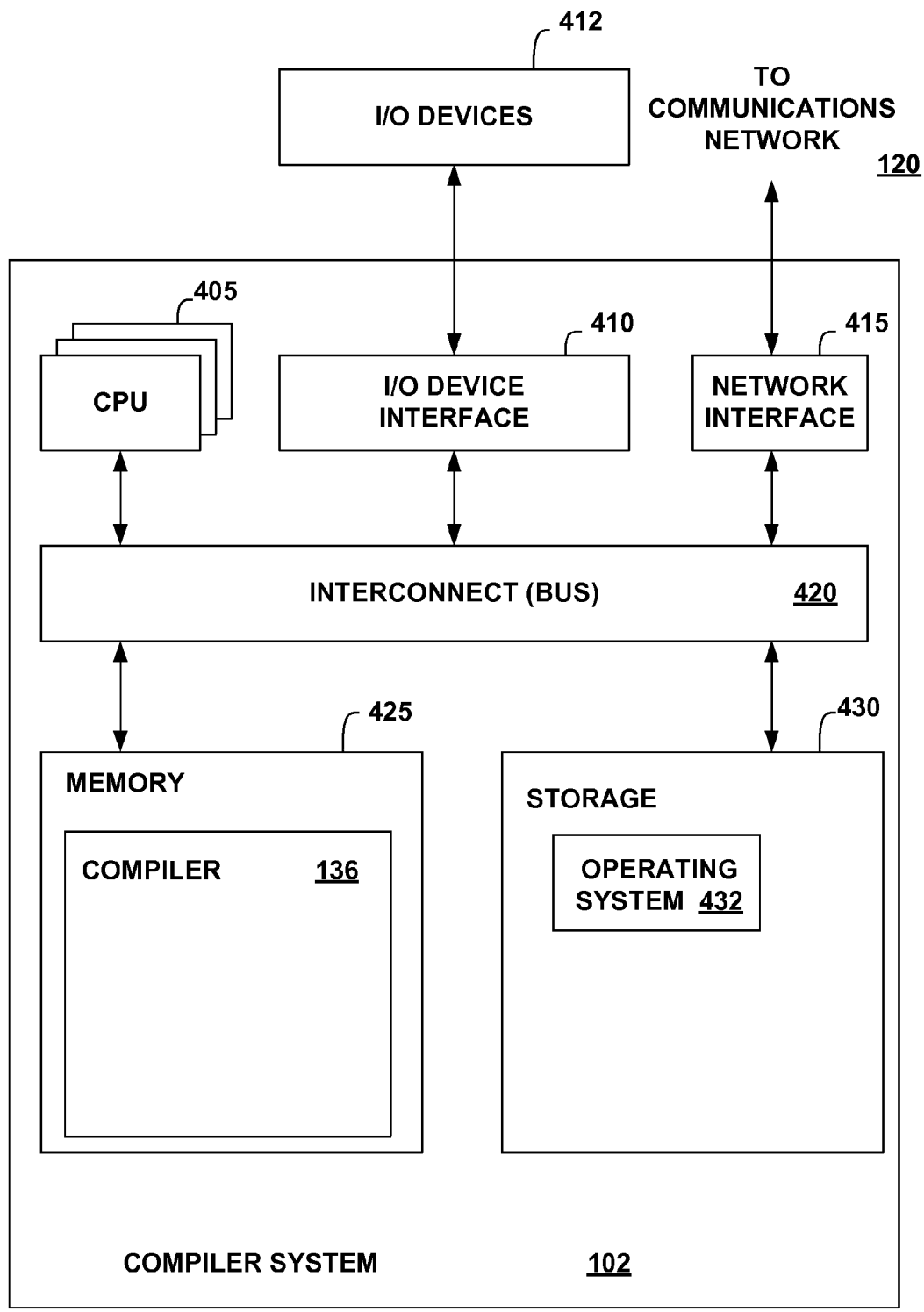
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
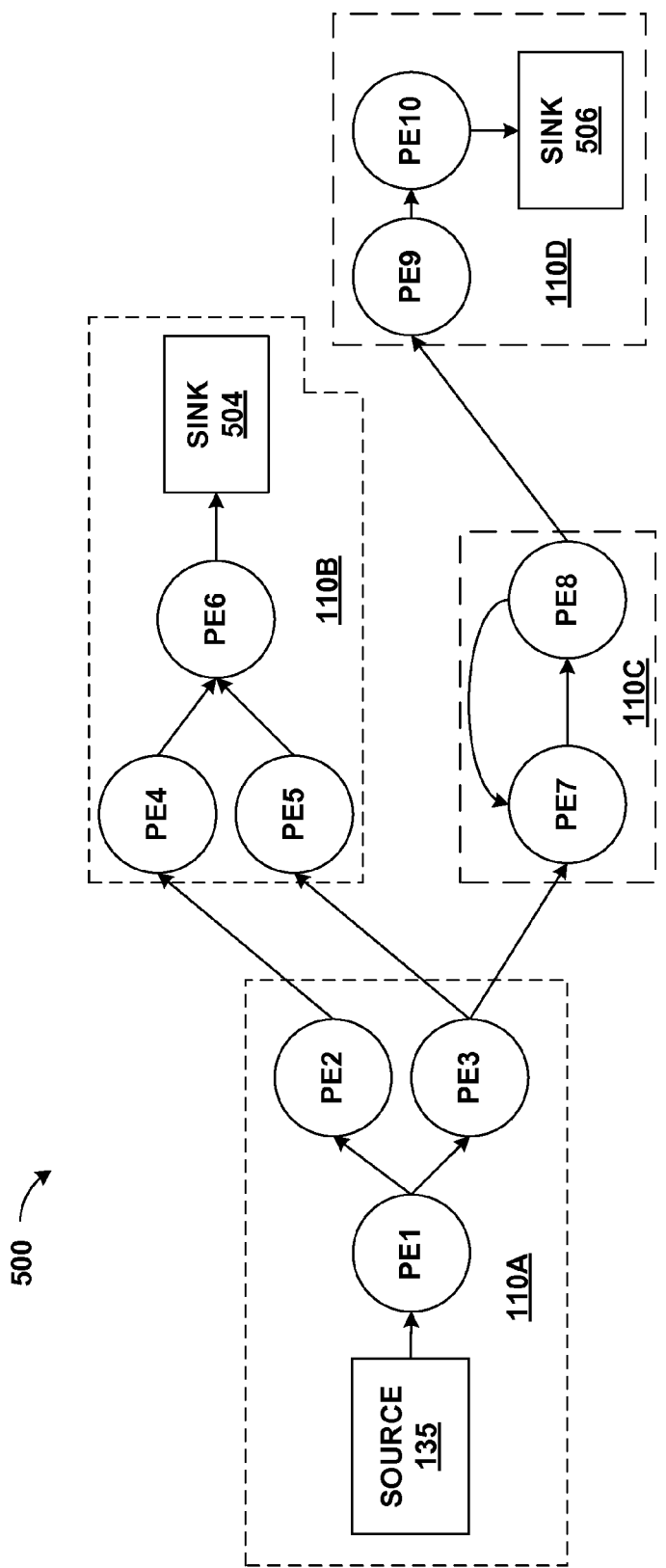
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, it should be appreciated that an operator graph may be much more complex and may include many individual operator graphs that may be statically or dynamically liked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

A processing element or stream operator may perform an operation that employs a windowing condition. A "window," as referred to in this description and the claims, is a logical container for tuples received by an input port of a stream operator. Conceptually, a stream may be considered a pseudo-infinite sequence of tuples. A windowing condition may allow for the creation of subsets or groups of tuples within a stream, allowing a stream operator to perform an operation on a group of tuples instead of a single tuple. As an example, an aggregate stream operator supports windowing by default. However, a stream operator may not necessarily support windowing by default. A stream operator may, however, be configured to support windowing.

A window may be a tumbling or sliding window. A tumbling window may be specified by an eviction policy. When the eviction policy for a tumbling window is met, the stream operator executes operator logic on the tuples currently in the window and then empties the window. With respect to a tumbling window, the "conclusion" of a windowing condition, in this description and the claims, may refer to when the eviction policy for a tumbling window is met. The eviction policy of a tumbling window may be based on a count of tuples, a time interval, a delta, or punctuation. A delta is a difference between an attribute of an oldest tuple and a newest tuple. For example, a windowing condition may compare timestamps. Processing and eviction may be triggered when a time difference exceeds a specified value. A punctuation is a control signal that appears interleaved with the tuples in a stream. Punctuation appears in the data flow and may, for example, notify a stream operator of the grouping of tuples to be processed.

In contrast to a tumbling window, a sliding window does not automatically flush the window when the window is full. Once a window is full, a sliding window expels the oldest tuple when a new tuple arrives to replace it. In this way, a sliding window maintains the size of the window. A sliding window may be specified by an eviction policy and a trigger policy. The eviction policy of a sliding window may be based on a count of tuples, a time interval, or an attribute delta. The trigger policy specifies when the stream operator executes operator logic on the tuples currently in the window. The trigger policy may be based on a count of tuples, a time interval, or an attribute delta. The eviction and trigger policies are independent of one another. With respect to a sliding window, the "conclusion" of a windowing condition, as used in this description and the claims, may refer to when the trigger condition of a sliding window is met.

The phrase "windowing conditions," as used in this description and the claims, may include the conditions used to describe eviction and trigger policies. A stream operator that includes a windowing condition may be referred to, in this description and the claims, as a windowing operator. Windowing may be specified in any number of ways. For example, an application programmer may define one or more specific windowing conditions. Additionally, the system may provide a set of windowing conditions.

A processing element may have a windowing operator that performs an operation to determine a first value at the conclusion of a windowing condition, i.e., when the eviction policy for a tumbling window is met or when the trigger condition of a sliding window is met. The phrase "windowing operation," as used in this description and the claims, may refer to the operation to determine a first value at the conclusion of a windowing condition. In one embodiment, a windowing operator may determine whether a condition to end a windowing operation before the conclusion of the windowing condition is met. The condition may be determined from one or more tuples received within the windowing condition. This determination may be made at any time before the conclusion of the windowing condition. This determination may be based on a fixed value, such as a count of tuples, a time interval, or an attribute delta. Alternatively, this determination may be based on a dynamically determined value as described below. When it is determined that the condition to end the windowing operation has been met, the windowing operator may end the windowing operation before the windowing condition concludes. Upon ending the windowing operation before the windowing condition concludes, the windowing operator may perform a further action or operation, such as signaling that the windowing operation was ended before the windowing condition concluded.

In one embodiment, the condition to end a windowing operation early may be determined one or more times before the windowing condition concludes. For example, the eviction policy for a tumbling window may be specified as a tuple count, e.g., the windowing condition concludes when the count reaches 1,000 tuples. A windowing operator may determine from tuples received within the windowing condition whether a condition to end the windowing operation before the conclusion of the windowing condition is met. The windowing operator may determine whether the condition to end the windowing operation before the count of 1,000 tuples is reached upon reaching a specified count of tuples, such as 250 tuples. The count may be may specified by a developer of a stream computing application. Alternatively, the windowing operator may determine whether the condition to end the windowing operation before the count of 1,000 tuples is reached more than one times. The condition to end the windowing operation early may be determined upon reaching a count of 250 tuples. If the condition is not met, the condition to end the windowing operation early may be determined again upon reaching a count of 500 tuples. If the condition is still not met, the condition to end the windowing operation early may be determined again upon reaching a count of 750 tuples. The multiple count values may be may specified by a developer of a stream computing application.

The condition to end a windowing operation early may be related to or the same as the operation performed at the conclusion of a windowing condition. For example, a processing element may have a windowing operator that performs an aggregate operation to determine a first value at the conclusion of a windowing condition. In one embodiment, the condition to end an aggregation operation before the windowing condition concludes may include determining or evaluating a sum from one or more tuples received within the windowing condition. As a second example, a processing element may have a windowing operator that performs an averaging operation to determine a first value at the conclusion of a windowing condition. In one embodiment, the condition to end an averaging operation before the windowing condition concludes may include determining or evaluating an average. Examples of conditions to end aggregate and averaging operations early follow.

First, an example of a condition to end an aggregate operation early is described. There may be a need to know if the aggregate amount of energy consumed in an electric power grid over some unit of time, e.g., one hour, exceeds a particular value. If the aggregate amount of energy consumed exceeds a parameter deemed significant, it may indicate a need to take some action, such as bringing more energy production online. A stream of tuples may flow in an operator graph. The tuples may have an attribute that describes the amount of energy consumed per unit of time, e.g., five minutes, for individual electricity consumers. Assume that there are 1,000 electricity consumers and each consumer generates a tuple every five minutes. For a one hour period, 12,000 tuples are generated.

Referring again to FIG. 5, the processing element PE4 may have a windowing operator that performs an aggregate operation to determine a first value when the eviction policy for a tumbling window is met. For example, the eviction policy may specify one hour or 12,000 tuples. When the windowing condition concludes, the processing element PE4 determines the first value, which may be an aggregation of the energy consumed for individual electricity consumers as determined from the tuples in the window. Assume that if the first value exceeds a particular value, e.g., 1,000 kilowatts, a need to take action is indicated. It would be desirable to know whether a sum exceeds the particular value before the windowing condition concludes. Knowing that the sum exceeds the value before the windowing condition concludes may conserve processing resources and permit responsive action to be taken earlier than otherwise.

In one embodiment, a windowing operator in PE4 may determine from one or more tuples received within a window whether a condition is met. If the condition is met, the windowing operation is ended before the conclusion of a windowing condition (e.g., one hour or 12,000 tuples). Continuing the above example, the condition may be that a sum of energy consumed exceeds 1,000 kilowatt-hours. If the windowing condition specifies a first time period, e.g., one hour, the condition to end the windowing operation before the conclusion of a windowing condition may be determined after a second time period. The second time period may be determined by a developer and may be shorter than the first time period, e.g., 15 minutes. On the other hand, if the windowing condition specifies a first count, e.g., 12,000 tuples, the condition to end the windowing operation before the conclusion of a windowing condition may be determined after a second count. The second count may be shorter than the first count, e.g., 1,000 tuples and determined by a developer. If PE4 determines that the condition to end the windowing operation before the conclusion of a windowing condition is met (the sum of energy consumed exceeds 1,000 kilowatt-hours after 15 minutes or 1,000 tuples), it may end the windowing operation before the windowing condition concludes, e.g., at one hour or 12,000 tuples. Upon ending the windowing operation, the windowing operator may perform an additional operation, such as providing an indication that the windowing operation ended early. In summary, a windowing operation may determine a first sum from tuples received during a windowing condition and the condition to end the windowing operation early may include determining that a second sum differs from a particular value, e.g., exceeds a threshold, according to one embodiment. In an alternative embodiment, instead of determining first and second sums, a windowing operation may determine first and second counts, minimums, maximums, or other similar values. In addition, the condition to end the windowing operation early may be based on whether the second sum is differs from the first sum by a particular value or percentage.

If the condition to end the windowing operation early is not met, the windowing operation may continue to conclusion. Alternatively, if the condition to end the windowing operation early is not met, the condition to end the windowing operation may be modified. Continuing the example, if the sum of energy consumed does not exceed 1,000 kilowatt-hours after 15 minutes, it may be determined whether the sum of energy consumed exceeds 1,000 kilowatt hours after 30 minutes. Alternatively, the sum of energy consumed may be updated with each input tuple and the windowing condition may be deemed to be met when the sum first exceeds 1,000 kilowatt-hours.

An example of a condition to end an aggregate operation early is next described. There may be a need to know if the average amount of energy consumed by individual consumers in an electric power grid exceeds a particular value. If the average amount of energy consumed for the population of consumers exceeds a parameter deemed significant, it may indicate a need to take some action, such as bringing more energy production online. A stream of tuples may flow in an operator graph. The tuples may have an attribute that describes the amount of energy consumed in a standardized unit of time, e.g., five minutes, for individual electricity consumers. Assume that there is a population of 1,000 electricity consumers and each consumer generates a tuple every five minutes. In a five minute period, 1,000 tuples are generated. Assume that it is deemed significant if the average amount of energy consumed for the population of consumers exceeds one kilowatt. Accordingly, in this example, it is desired to determine every five minutes if the average energy consumption for the population of 1,000 exceeds one kilowatt.

The processing element PE4 (FIG. 5) may have a windowing operator that performs an operation to determine an average when the eviction policy for a tumbling window is met. The eviction policy may specify five minutes. When the windowing condition concludes, the processing element PE4 determines the average energy consumption for the tuples in the window. It may be desirable if average energy consumption could be determined from the approximately 200 tuples received in the first minute of the windowing condition. However, the average energy consumption determined from the approximately 200 tuples should preferably be the same as or approximate the average energy consumption determined from 1,000 tuples over the five-minute window.

In one embodiment, a windowing operator in PE4 (FIG. 5) may determine whether a condition to end the operation before the conclusion of the windowing condition is met from one or more tuples received within a windowing condition. The condition to end the operation to determine average energy consumption early before the windowing condition concludes may include determining an average energy consumption from the tuples received in the first minute of the windowing condition and evaluating whether the determined average is the same as, or approximates, within a specified degree of confidence, e.g., 95%, the average energy consumption determined from 1,000 tuples over the five minute window. The evaluation may be based on whether the average determined from the tuples received in the first minute differs from a particular value or a particular percentage. For example, the evaluation may be based on whether the average determined from the tuples received in the first minute differs from the average determined for a preceding five-minute interval by the particular value or percentage.

In addition, the evaluating of whether the average determined from a one minute interval is the same as, or approximates within a specified degree of confidence, the average energy consumption determined from 1,000 tuples over the five-minute window may be based on a statistical technique, such as the value of a standard deviation. For example, the evaluation may be based on whether the standard deviation determined from the approximately 200 tuples received in the first minute differs from the standard deviation determined for a preceding five-minute interval by a particular value or percentage.

Moreover, the evaluating of whether the average determined from a one minute interval is the same as, or approximates within a specified degree of confidence, the average energy consumption determined from 1,000 tuples over the five-minute window may be based on any suitable statistical technique, such as one that uses the Student's t-distribution ("t-distribution"). The t-distribution may be used to estimate how likely it is that a true mean, in this example, the average determined over the five-minute window, lies within any given range, e.g., a confidence interval. If the average determined from the tuples received in a one-minute interval (a sample mean) lies within the confidence interval, it may be inferred that this average approximates the average determined over the five-minute window (true mean), within a specified degree of confidence, and the windowing operation may be ended before the windowing condition concludes.

When the t-distribution is used, if the condition to end the operation to determine average energy consumption before the windowing condition concludes is not met after a first time period or first number of tuples (i.e., the sample average is outside the confidence interval), the condition to end the windowing operation early may be modified on the fly to extend the time period or number of tuples. Alternatively, the condition to end the windowing operation early may be modified on the fly to continuously determine and test sample means until the early-end condition is met. With the t-distribution, the larger the number of samples (in t-distribution terminology, the more degrees of freedom), the more likely it is that the mean determined from the samples will be statistically representative of the mean determined from the entire population. Dynamically modifying the condition to include a larger time period or number of tuples, e.g., increasing the time from one to two minutes, increasing the number of tuples received from 200 to 400, or continually increasing the number of tuples or time period until a sample average is within a confidence interval makes it more likely that the condition to end the operation early will be met.

In summary, a windowing operation may determine a first average from tuples received during a windowing condition and a condition to end the windowing operation early may include determining that a second average is representative of the first average, according to one embodiment. The average may be any suitable measure of central tendency, including an arithmetic mean, geometric mean, median, mode, or any similar statistic.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method for processing tuples, comprising:
 receiving two or more tuples to be processed by a processing element, the processing element operating on one or more computer processors, the processing element having a windowing operator performing a windowing operation to determine a first value at the conclusion of a windowing condition, wherein tuples are accepted into and retained in a first window until the windowing condition is met, the windowing condition being an eviction condition, and the windowing operation is performed using all of the tuples in the first window when the windowing condition is met and all of the tuples in the first window are evicted when the windowing condition is met;
 determining from one or more tuples received within the first window before the windowing condition is met whether a condition to end the windowing operation is met; and
 ending the windowing operation before the windowing condition concludes when the condition to end the windowing operation is met.

2. The method of claim 1, wherein the condition to end the windowing operation is determined two or more times within the first window before the windowing condition is met.

3. The method of claim 1, wherein the condition to end the windowing operation is dynamically determined within the windowing condition.

4. The method of claim 1, wherein the windowing operation further includes determining a first sum and the condition to end the windowing operation includes evaluating a second sum.

5. The method of claim 1, wherein the windowing operation further includes determining a first central tendency metric and the condition to end the windowing operation includes evaluating a second central tendency metric.

6. The method of claim 5, wherein the evaluating of the second central tendency metric includes determining a standard deviation.

7. The method of claim 5, wherein the evaluating of the second central tendency metric includes determining a confidence interval for a t-distribution.

8. A computer program product for processing a stream of tuples, the computer program product comprising a non-transitory computer readable storage medium having program code embodied therewith, the program code comprising computer readable program code configured to:
 receive two or more tuples to be processed by a processing element, the processing element operating on one or more computer processors, the processing element having a windowing operator performing a windowing operation to determine a first value at the conclusion of a windowing condition, wherein tuples are accepted into and retained in a first window until the windowing condition is met, the windowing condition being an eviction condition, and the windowing operation is performed using all of the tuples in the first window when the windowing condition is met and all of the tuples in the first window are evicted when the windowing condition is met;
 determine from one or more tuples received within the first window before the windowing condition is met whether a condition to end the windowing operation is met; and
 end the windowing operation before the windowing condition concludes when the condition to end the windowing operation is met.

9. The computer program product of claim 8, wherein the condition to end the windowing operation is determined two or more times within the first window before the windowing condition is met.

10. The computer program product of claim 8, wherein the condition to end the windowing operation is dynamically determined within the windowing condition.

11. The computer program product of claim 8, wherein the windowing operation further includes determining a first sum and the condition to end the windowing operation includes evaluating a second sum.

12. The computer program product of claim 8, wherein the windowing operation further includes determining a first central tendency metric and the condition to end the windowing operation includes evaluating a second central tendency metric.

13. The computer program product of claim 12, wherein the evaluating of the second central tendency metric includes determining a confidence interval for a t-distribution.

\* \* \* \* \*